United States Patent
Champalou et al.

(10) Patent No.: US 9,541,184 B2
(45) Date of Patent: Jan. 10, 2017

(54) MECHANICAL SYSTEM, INJECTION PUMP AND VALVE ACTUATOR COMPRISING SUCH A MECHANICAL SYSTEM AND MANUFACTURING METHOD

(71) Applicants: François Champalou, Chaumont-sur-Loire (FR); Richard Corbett, Fondettes (FR); Benoît Hauvespre, Saint Etienne de Chigny (FR)

(72) Inventors: François Champalou, Chaumont-sur-Loire (FR); Richard Corbett, Fondettes (FR); Benoît Hauvespre, Saint Etienne de Chigny (FR)

(73) Assignee: AKTIEBOLAGET SKF, Gothenburg (SE)

( * ) Notice: Subject to any disclaimer, the term of this patent is extended or adjusted under 35 U.S.C. 154(b) by 96 days.

(21) Appl. No.: 14/499,774

(22) Filed: Sep. 29, 2014

(65) Prior Publication Data

US 2015/0090211 A1   Apr. 2, 2015

(30) Foreign Application Priority Data

Sep. 27, 2013   (EP) .................................... 13186517

(51) Int. Cl.
*F01L 1/14*   (2006.01)
*F16H 53/06*   (2006.01)
*F02M 37/06*   (2006.01)

(52) U.S. Cl.
CPC ................ *F16H 53/06* (2013.01); *F01L 1/14* (2013.01); *F02M 37/06* (2013.01); *F01L 2105/02* (2013.01); *F01L 2107/00* (2013.01); *Y10T 29/49647* (2015.01); *Y10T 74/2107* (2015.01)

(58) Field of Classification Search
CPC ......... F16H 53/06; F01L 2107/00; F01L 1/16; F01L 1/143; F01L 1/14
See application file for complete search history.

(56) References Cited

U.S. PATENT DOCUMENTS

| 3,795,229 | A |   | 3/1974 | Weber |
| 5,743,224 | A | * | 4/1998 | Hosaka .................. F01L 1/143 123/90.48 |
| 6,688,269 | B1 |   | 2/2004 | Steinmetz |

(Continued)

FOREIGN PATENT DOCUMENTS

| DE | 3627505 A1 | * | 2/1988 | .............. F01L 1/143 |
| DE | 19548808 A1 |   | 7/1997 | |

(Continued)

*Primary Examiner* — Zelalem Eshete
(74) *Attorney, Agent, or Firm* — Bryan Peckjian; SKF USA Inc. Patent Dept.

(57) ABSTRACT

A mechanical system, comprising a support element having an outer surface adapted to slide in a housing receiving the mechanical system, a pin extending along a first axis and comprising two opposite ends, each adapted to be fitted in the support element for radial and/or axial retention of the pin relative to the first axis, and a roller element movable in rotation relative to the pin around the first axis. The mechanical system comprises at least one outer insert positioned at the outer surface of the support element. The mechanical system can be integrated into either an injection pump or a valve actuator.

19 Claims, 6 Drawing Sheets

(56) References Cited

U.S. PATENT DOCUMENTS

| | | | | |
|---|---|---|---|---|
| 7,497,157 | B2* | 3/2009 | Aoki | F02M 47/027 |
| | | | | 74/569 |
| 7,793,583 | B2* | 9/2010 | Radinger | F01L 1/143 |
| | | | | 74/569 |
| 8,863,615 | B2* | 10/2014 | Yabuuchi | F01L 1/143 |
| | | | | 74/569 |
| 2008/0068116 | A1* | 3/2008 | Marukawa | H01H 50/305 |
| | | | | 335/202 |
| 2008/0190237 | A1* | 8/2008 | Radinger | F01L 1/143 |
| | | | | 74/569 |
| 2010/0294219 | A1* | 11/2010 | Prokop | F01L 1/14 |
| | | | | 123/90.5 |
| 2011/0158835 | A1* | 6/2011 | Yabuuchi | F01L 1/143 |
| | | | | 417/471 |
| 2012/0152187 | A1 | 6/2012 | Cornett et al. | |
| 2013/0340695 | A1* | 12/2013 | Fujii | F01L 1/14 |
| | | | | 123/90.48 |

FOREIGN PATENT DOCUMENTS

| | | |
|---|---|---|
| DE | 19642431 A1 | 4/1998 |
| DE | 19857376 A1 | 6/2000 |
| DE | 19909418 A1 | 9/2000 |
| DE | 102007006320 A1 | 8/2008 |
| EP | 0180872 A2 | 5/1986 |
| EP | 0190418 A1 | 8/1986 |
| EP | 2607636 A1 | 6/2013 |
| GB | 871951 A | 7/1961 |
| GB | 1066400 A | 4/1967 |
| GB | 1325622 A | 8/1973 |
| WO | 2013119214 A1 | 8/2013 |

* cited by examiner

MECHANICAL SYSTEM, INJECTION PUMP AND VALVE ACTUATOR COMPRISING SUCH A MECHANICAL SYSTEM AND MANUFACTURING METHOD

CROSS REFERENCE TO RELATED APPLICATION

This is a National Stage application claiming the benefit of European Union Patent Application Number 13186517.2 filed on 27 Sep. 2013, which is incorporated herein by reference in its entirety.

TECHNICAL FIELD OF THE INVENTION

The invention concerns a mechanical system. The invention also concerns an injection pump and a valve actuator for a motor vehicle, by example for a diesel truck or gasoline car engine, each comprising such a mechanical system. The invention also concerns a method for manufacturing such a mechanical system.

BACKGROUND OF THE INVENTION

Classically, a cam follower belonging to an injection pump comprises a tappet, a roller and a pin. The roller and the pin are centered on a transverse axis, while the tappet extends along a longitudinal axis. The pin is fixed to the tappet, while the roller is movable in rotation relative to the pin around its axis. When the cam follower is in service, the roller collaborates with a cam synchronized with the internal combustion engine camshaft. The rotation of the camshaft leads to a periodic displacement of a piston of the pump that rests against the tappet, to allow fuel to be delivered. The tappet is movable back and forth along the longitudinal axis.

It is known to ensure the retention of the pin relative to the tappet by caulking, press-fitting, clipping or using a circlip, in particular depending on configuration and material of the tappet.

EP-A-2 607 636 describes a cam follower comprising a tappet formed with two lateral flanges, delimiting an intermediate gap between them and each comprising a cylindrical bore. The roller is positioned in the intermediate gap, between both flanges and bores. The pin is then caulked, in other words plastically deformed, on both opposite ends to create a mechanical connection by press-fit in the tappet bores.

U.S. Pat. No. 6,688,269 describes a cam follower with a tappet comprising two pairs of tabs, which are elastically deformable and into which the pin is clipped.

SUMMARY OF THE INVENTION

The aim of the invention is to provide an improved mechanical system, such as a cam follower or a rocker arm.

To this end, the invention concerns a mechanical system, comprising a support element having an outer surface adapted to slide in a housing receiving the mechanical system, a pin extending along a first axis and comprising two opposite ends, each adapted to be fitted in the support element for radial and/or axial retention of the pin relative to the first axis, and a roller element movable in rotation relative to the pin around the first axis.

According to the invention, the mechanical system comprises at least one outer insert positioned at the outer surface of the support element.

Thanks to the invention, when the support element slides in the housing surrounding its outer surface, the wear of this outer surface is reduced. The housing is generally made of metal. The support element can be manufactured in synthetic material, such that weight and cost of the system are reduced. The support element may be a tappet belonging to a cam follower. In operation, the tappet is protected by the insert when moving back and forth in the housing. Depending on operating conditions of the system, such as load applied on the roller, translation speed of the tappet and material of the bore housing, the material, position and/or number of the outer insert(s) may vary without leaving the scope of the invention.

According to further aspects of the invention which are advantageous but not compulsory, such a mechanical system may incorporate one or several of the following features:
  The support element is overmolded onto the outer insert.
  The outer insert is snapped in a groove formed in the support element.
  The support element is made of synthetic material, for example of polyamide or polyether-ether-ketone.
  The mechanical system comprises at least two outer inserts positioned at the outer surface of the support element, preferably distributed along and/or around a second axis which is perpendicular to the first axis and on which the outer surface is centered.
  The or each outer insert is closer to an aperture of the support element opposite the pin than to the pin.
  The outer insert has a closed annular shape extending along the outer surface.
  The outer insert has a partial annular shape and extends partly along the outer surface, by example over an angle of 90 or 180 degrees around a second axis perpendicular to the first axis and on which the outer surface is centered.
  The outer insert has end lugs, in particular for clipping the outer insert onto the support element.
  The outer insert has lateral lugs, in particular for strengthening the bond between the outer insert and the support element by overmolding.
  The mechanical system comprises at least one antirotation device integrally formed with the support element, with the outer insert and/or with a support insert fixed to the support element.
  The mechanical system constitutes a cam follower, wherein the support element is a tappet movable along a translation axis perpendicular to the first axis and wherein the roller element is adapted to roll on an outer surface of a cam.

The invention also concerns an injection pump for a motor vehicle, equipped with a mechanical system as mentioned here-above.

The invention also concerns a valve actuator for a motor vehicle, equipped with a mechanical system as mentioned here-above.

The invention also concerns a method for manufacturing a mechanical system as mentioned here-above, wherein the support element is overmolded onto the outer insert or the outer insert is snapped in a groove formed in the support element.

BRIEF DESCRIPTION OF THE DRAWINGS

The invention will now be explained in correspondence with the annexed figures, as an illustrative example, without restricting the object of the invention. In the annexed figures.

DETAILED DESCRIPTION OF SOME EMBODIMENTS

The mechanical system 1 represented on FIGS. 1 to 6 is of the cam follower type, adapted to equip an injection pump for a motor vehicle, preferably for a gasoline car engine, not shown.

The system 1 comprises a tappet 10, a pin 30, a roller 40, a rolling bearing 50 and an insert 60. Pin 30, roller 40 and bearing 50 are centered on a transverse axis X1, while tappet 10 is centered on a longitudinal axis Y1. Axis X1 and Y1 are perpendicular.

Figure 1:
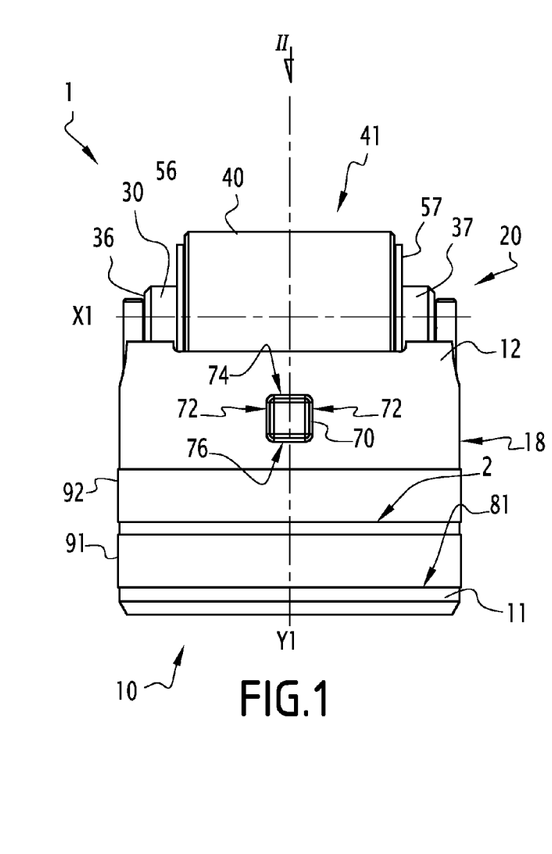
FIG. 1 is a side view of a mechanical system according to the invention, of the cam follower type, comprising a tappet, a pin and a roller.
Figure 2:
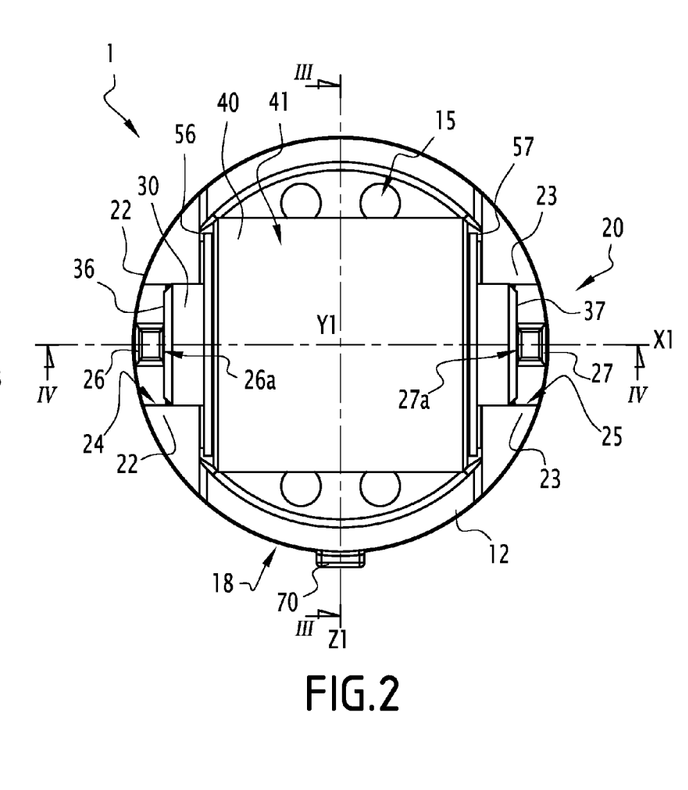
FIG. 2 is a top view, along arrow II of FIG. 1.
Figure 3:
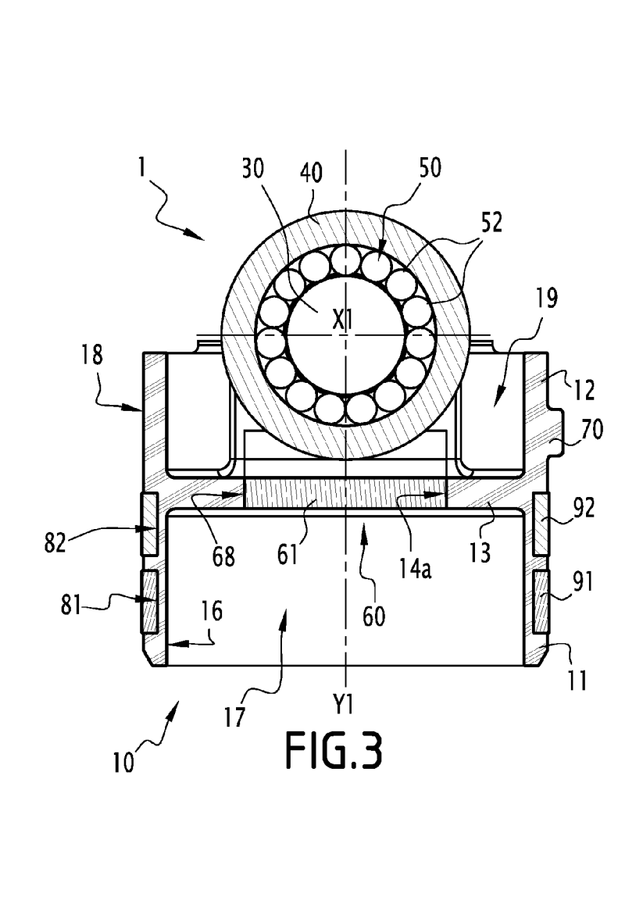
FIG. 3 is a sectional view along line III-III of FIG. 2.
Figure 4:
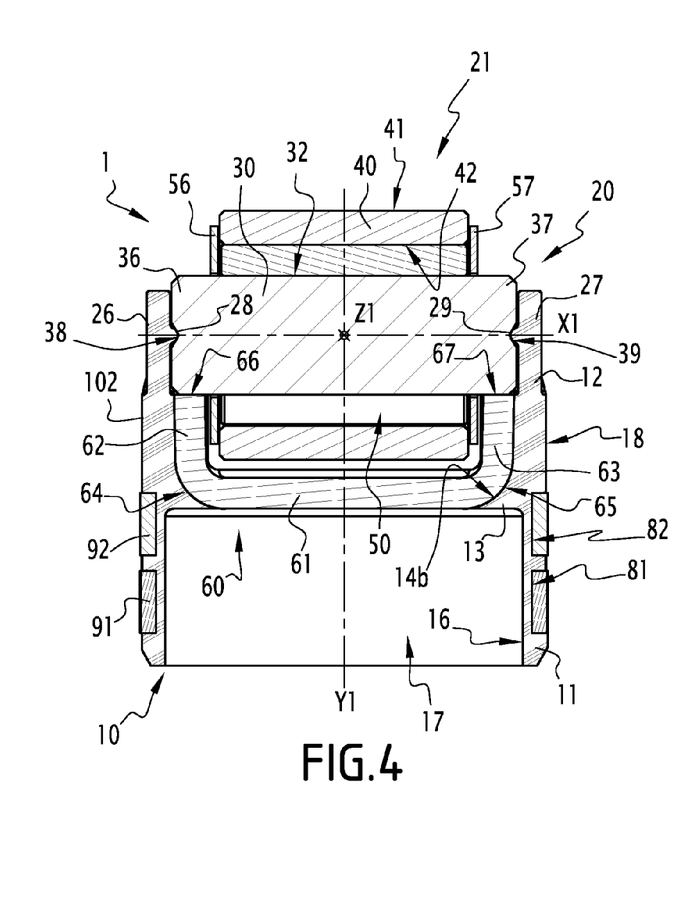
FIG. 4 is a sectional view along line IV-IV of FIG. 2.
Figure 5:
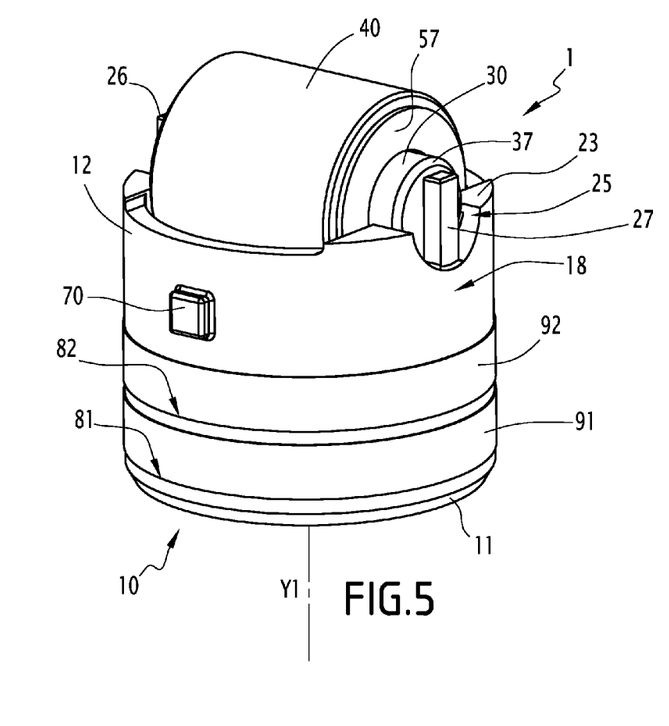
FIG. 5 is a perspective view showing the mechanical system of FIGS. 1 to 4.
Figure 6:
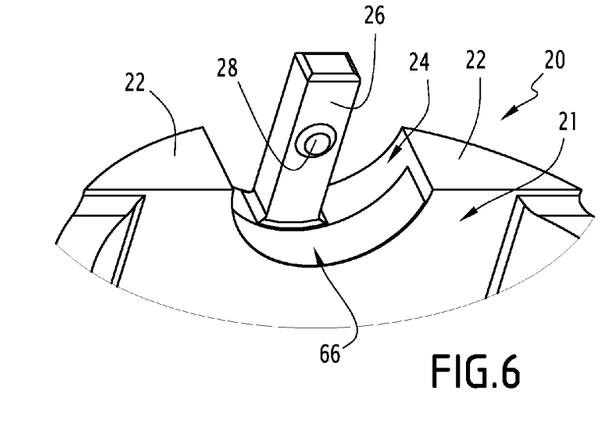
FIG. 6 is a partial perspective view, at a different scale, partly showing a bearing portion belonging to the mechanical system of FIGS. 1 to 5, the pin and roller being not shown.

As shown on FIGS. 3 and 4, the tappet 10 comprises a first cylindrical portion 11, a second cylindrical portion 12 and a central radial portion 13 interposed between portions 11 and 12. Tappet 10 also comprises a bearing portion 20 extending from portion 12 opposite portions 11 and 13. Cylindrical portion 11 has a cylindrical inner bore 16 delimiting a cavity 17 inside tappet 10. This cavity 17 is adapted to receive a plunger or a push rod, not shown, following tappet 10 along axis Y1. Cylindrical portion 12 delimits another cavity 19 inside tappet 10, partly receiving pin 30, roller 40 and bearing 50. Portion 13 comprises plane surfaces 14a and curved surfaces 14b surrounding insert 60. Four holes 15 extend through portion 13 parallel to axis Y1, connecting cavities 17 and 19, to allow a flow of lubricant therebetween. Tappet 10 has a cylindrical outer surface 18, with a circular basis, centered on axis Y1 and extending along both portions 11 and 12.

Tappet 10 is movable back and forth along axis Y1, in a non-represented housing belonging to the injection pump, with surface 18 sliding in a bore of this housing. Tappet 10 is preferably made of plastic or synthetic material, by example polyamide 6,6 (PA) or polyether-ether-ketone (PEEK). Alternatively, tappet 10 may be made of metal, by example steel. Material of the tappet 10 is chosen resistant to oil, its additives and temperature variations.

Furthermore, tappet 10 forms a support element for pin 30, roller 40 and bearing 50. More precisely, bearing portion 20 of tappet 10 is adapted to receive pin 30, on which roller 40 and bearing 50 are mounted. To this end, bearing portion 20 comprises two pairs of rims 22 and 23, two partial cylindrical bores 24 and 25 and two opposed tabs 26 and 27, delimiting together an intermediate gap 21 receiving pin 30.

Pairs of rims 22 and 23 extend from portion 12 on both side of axis Y1. Each pair of rims 22 or 23 delimits a partial cylindrical bore, respectively 24 and 25, centered on axis X1 and having the same diameter. Partial bores 24 and 25 form bearing sections receiving pin 30 in bearing contact radially to axis X1, particularly along a direction parallel to axis Z1. Pin 30 is positioned in bearing contact with sections 24 and 25 formed in bearing portion 20 and with sections 66 and 67 formed in insert 60.

Tabs 26 and 27 extend from portion 12 parallel to axis Y1 and perpendicular to axis X1. Tab 26 is located between rims 22, while tab 27 is located between rims 23, on respective side of axis Y1. Each of the tabs 26 and 27 is elastically deformable. The tabs 26 and 27 have inner faces resting on either side of the pin 30 along the first axis X1. The tabs 26 and 27 provide axial retention of pin 30 relative to axis X1. Inner face of tab 26 comprises a stub 28 protruding along axis X1 toward tab 27, while inner face of tab 27 comprises a stub 29 protruding along axis X1 toward tab 26. A recess 38 is formed inside end 36 along axis X1 by a blind hole, while a recess 39 is formed inside end 37 along axis X1 by a blind hole. Stub 28 is fitted inside recess 38, while stub 29 is fitted inside recess 39. Axial retention of pin 30 is ensured by tabs 26 and 27, while radial retention of pin 30 is ensured by stubs 28 and 29, together with sections 24, 25, 66 and 67.

In practice, bearing portion 20 may have different configurations without leaving the scope of the invention. Rims 22 and 23 and tabs 26 and 27 are designed with a mechanical resistance sufficient when system 1 is in service. Preferably, tabs 26 and 27 are integrally formed with tappet 10.

Pin 30 comprises a cylindrical surface 32 extending between two pin ends 36 and 37. In practice, pin ends 36 and 37 are adapted to be fitted in the bearing portion 20. More precisely, pin ends 36 and 37 are adapted to be positioned in the pairs of rims 22 and 23 and clipped between the tabs 26 and 27. Then, pin ends 36 and 37 are in contact with partial bores 24 and 25 and with tabs 26 and 27. Pin 30 is made of metal, such as steel or bronze.

Roller 40 has an outer cylindrical surface 41 and an inner cylindrical bore 42 centered on axis X1. Surface 41 is intended to bear against an outer surface of a non-represented cam, synchronized with the internal combustion engine camshaft.

Rolling bearing 50 comprises a series of rolls 52 extending parallel to axis X1 and distributed regularly around axis X1. Rolls 52 are interposed between surface 32 of pin 30 and surface 42 of roller 40. Alternatively, elements 52 may be needles, in this case bearing 50 is a needle bearing. Moreover, system 1 comprises lateral flanges 56 and 57 for axial retention of the rolls or needles 52 along axis X1.

As shown on FIGS. 3 and 4, insert 60 is preferably made of stamped metal sheet and assembled with tappet 10 by overmolding. Insert 60 comprises a plane central portion 61 and two plane lateral portions 62 and 63. Insert 60 comprises a curved portion 64 connecting portions 61 and 62 and a curved portion 65 connecting portions 61 and 63. Curved portions 64 and 65 are in contact with curved surfaces 14b of central portion 13. Insert 60 comprises a half-cylindrical section 66 supporting end 36 of pin 30 together with bore 24. Insert 60 comprises a half-cylindrical section 67 supporting end 37 of pin 30 together with bore 25. Central portion 61 comprises lateral plane surfaces 68 in contact with plane surfaces 14a of central portion 13. Insert 60 forms a support element for pin 30.

When mechanical system 1 is mounted, pin 30, roller 40 and rolling bearing 50 are inserted in the intermediate gap 21. Pin ends 36 and 37 are positioned in the pairs of rims 22 and 23, in bearing contact against bores 24 and 25 and sections 66 and 67. At this stage, roller 40 is movable in rotation relative to pin 30 around axis X1. Pin axis, roller axis and rolling bearing axis merge with axis X1. Roller 40 is then adapted to roll, more precisely its surface 41 can roll, on an outer surface of the non-represented cam. The load applied on surface 41 of roller 40 is transmitted to rolling bearing 50, then to pin 30, then to insert 60, then to tappet 10 and to the non-represented plunger or push rod located inside cavity 17 of tappet 10. Insert 60 is more resistant than bearing portion 20 to load transmitted from roller 40, in other words insert 60 increases mechanical resistance of system 1. Most of the load applied on roller 40 is received by insert 60 instead of tappet 10, then is transmitted to the plunger or push rod. Tappet 10 slides back and forth but bears few mechanical strains along axis Y1

Besides, system 1 comprises an antirotation device 70 integrally formed with tappet 10, on its outer surface 18. Device 70 is a pin protruding from surface 18 along a direction parallel to an axis Z1 perpendicular to axes X1 and Y1. Pin 70 has a parallelepiped section, more precisely a squared section, in a plane parallel to axes X1 and Y1. Pin 70 has two lateral faces 72 and upper and lower faces 74. When system 1 is operated, pin 70 and more precisely faces 72 cooperates with a non-represented guiding groove, formed in the housing surrounding tappet 10. Thus, pin 70 prevents tappet 10 from rotating in this housing around axis Y1. Depending on configuration of the injection pump, lower and upper faces 74 of pin 70 may form end stops adapted to abut against extremities of the guiding groove or of another part. On the example of FIGS. 1 to 6, pin 70 is closer to the aperture of cavity 19 than to the aperture of cavity 17.

Preferably, pin 70 is moulded as one single part together with tappet 10. As an alternative, pin 70 may be formed by plastic deformation of tappet 10, for example by punching from inside cavity 19 of tappet 10, with a punch deforming part 12. As another alternative, pin 70 may be machined in the mass of tappet 10.

Tappet 10 includes two annular grooves 81 and 82 centered on axis Y1 and open at surface 18. Groove 81 is formed in portion 11 near the aperture of cavity 17, while groove 82 formed near the junction of portions 11 and 13, closer than groove 81 to pin 30 and roller 40.

System 1 also includes two outer inserts 91 and 92 made of a material harder than those of the non-represented housing in which tappet 10 slides back and forth. Inserts 91 and 92 are preferably made of metal, by example steel such as 100C6. Each insert 91 and 92 has a shape of a closed annular ring extending along the outer surface 18 and surrounding axis Y1. Insert 91 is fitted inside groove 81, while insert 92 is fitted inside groove 82. Tappet 10 is preferably overmolded onto inserts 91 and 92. In practice, positions of the inserts 91 and 92 correspond to the areas of tappet 10 where the friction between surface 18 and its non-represented housing is the highest. Thus, inserts 91 and 92 allows to reduce wear of tappet 10 sliding in the non-represented housing.

Others embodiments of the invention are represented on FIGS. 7 to 15. Only the differences with respect to the first embodiment are described hereafter.

Figures 7, 8:
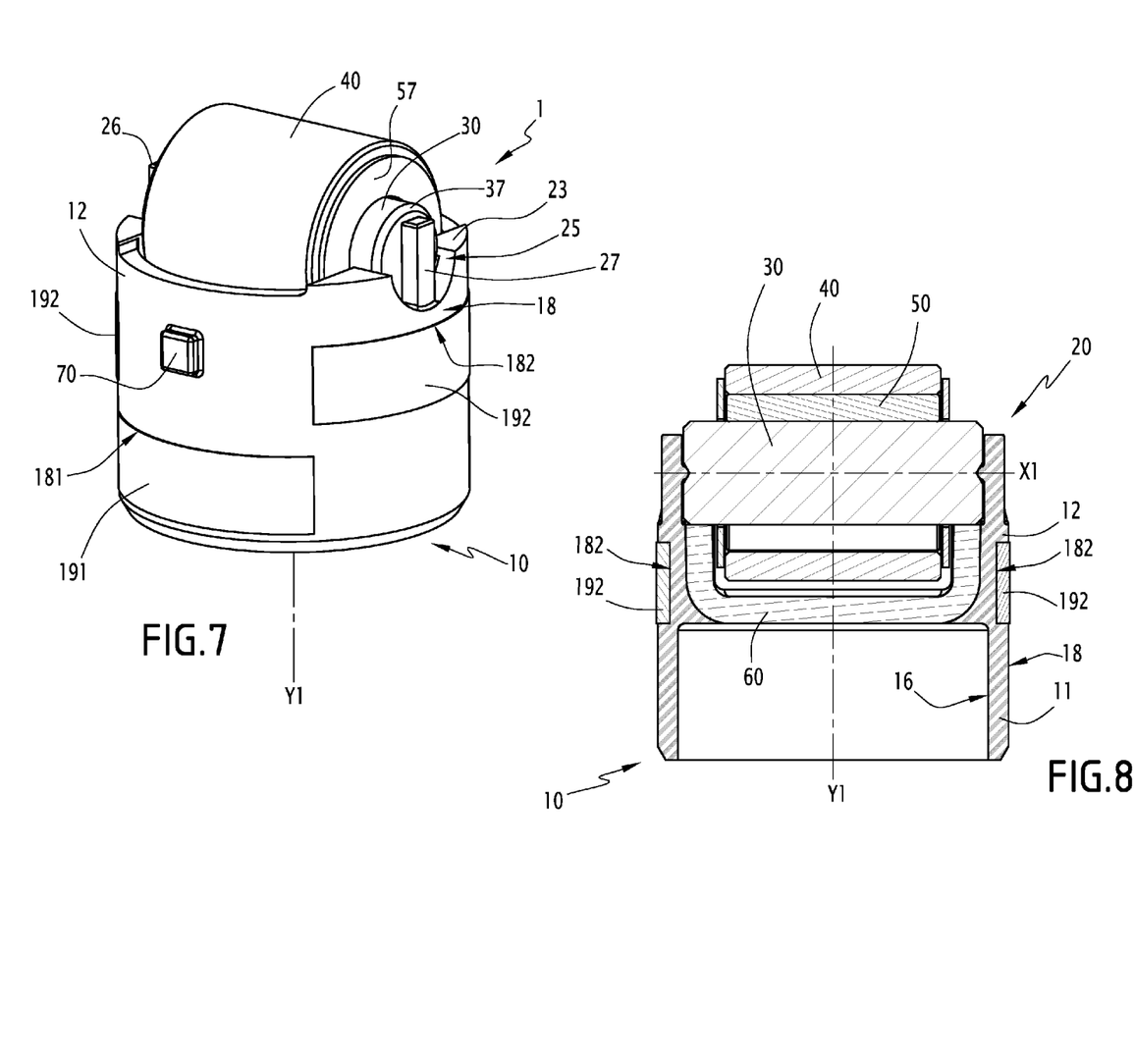
FIGS. 7 and 8 are views similar to FIGS. 5 and 4, showing a mechanical system according to a second embodiment of the invention.

A second embodiment of the invention is represented on FIGS. 7 and 8, wherein system 1 comprises four inserts, more precisely two inserts 191 disposed in grooves 181 and two inserts 192 disposed in grooves 182. Grooves 181 are formed in portion 11, near the aperture of cavity 17. Grooves 182 are formed near the junction of portions 11 and 13, closer than groove 181 to pin 30 and roller 40. Each groove 182 is formed near one of the tabs 26 or 27. Each groove 181 and 182 and each outer insert 191 and 192 has a partial annular shape and extends partly along the outer surface 18, over an angle of 90 degrees around axis Y1. The four inserts 191 and 192 are regularly distributed around axis Y1.

Figure 9:
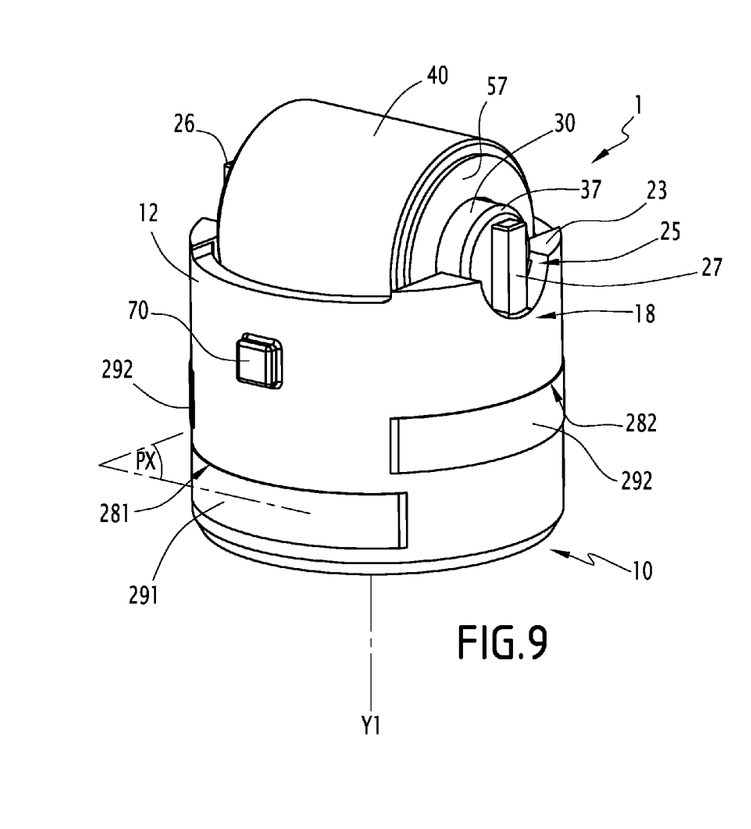
FIG. 9 is a view similar to FIGS. 5 and 7, showing a mechanical system according to a third embodiment of the invention.
Figure 10:
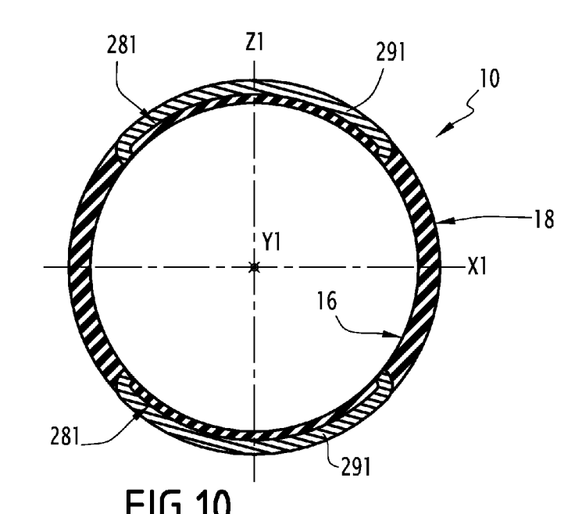
FIG. 10 is a sectional view along transversal plane PX of FIG. 9.
Figure 11:
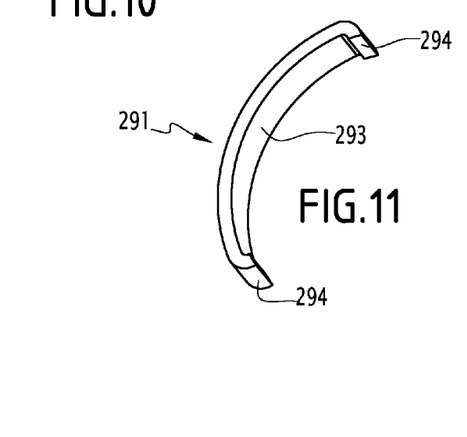
FIG. 11 is a perspective view of an insert belonging to the mechanical system of FIGS. 9 and 10.
Figure 12:
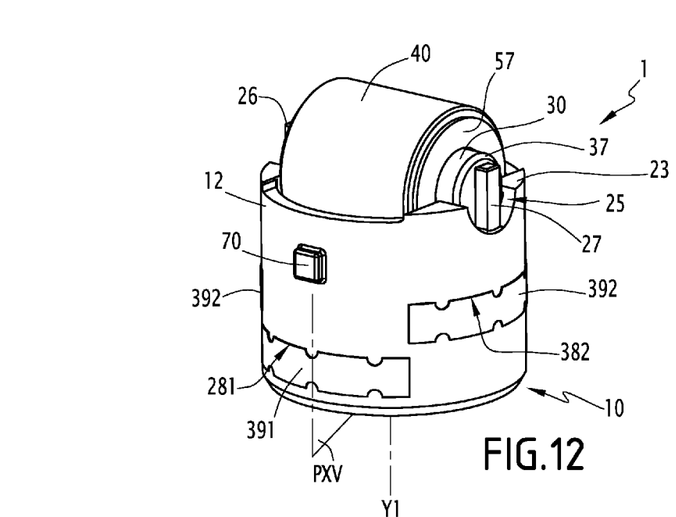
FIGS. 12 and 13 are views similar to FIGS. 9 and 10, at a different scale, showing a mechanical system according to a fourth embodiment of the invention.
Figure 13:
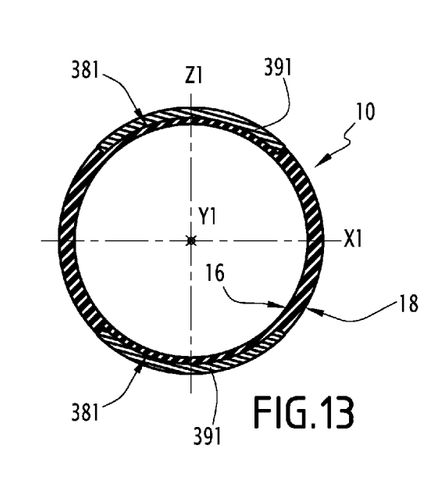
Figure 14:
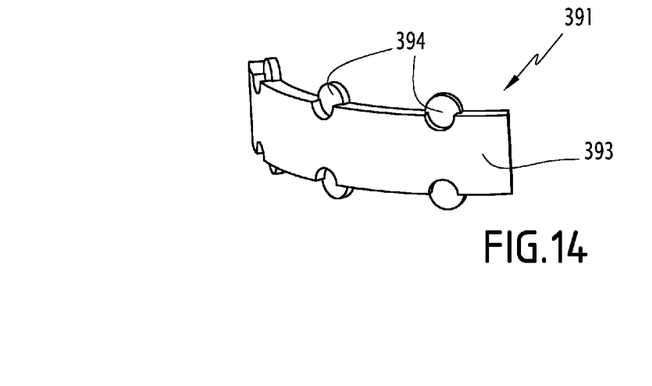
FIG. 14 is a perspective view of an insert belonging to the mechanical system of FIGS. 12 and 13.
Figure 15:
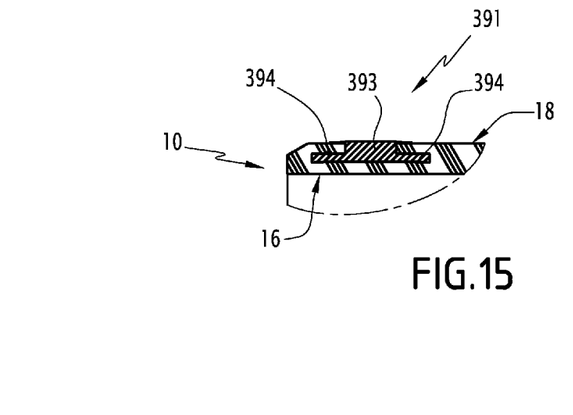
FIG. 15 is a sectional view along longitudinal plane PXV of FIG. 12.

A third embodiment of the invention is represented on FIGS. 9 to 11, wherein system 1 comprises four inserts, more precisely two inserts 291 disposed in grooves 281 and two inserts 292 disposed in grooves 282. Each groove 281 and 282 and each outer insert 291 and 292 has a partial annular shape and extends partly along the outer surface 18, over an angle of 90 degrees around axis Y1. The four inserts 291 and 292 are regularly distributed around axis Y1. As shown in particular on FIG. 11, each insert 291 and 292 comprises a body 293 and two end lugs 294. Thus, as an alternative to overmoulding, inserts 291 and 292 can be snapped in grooves 281 or 282.

A fourth embodiment of the invention is represented on FIGS. 12 to 15, wherein system 1 comprises four inserts, more precisely two inserts 391 disposed in grooves 381 and two inserts 392 disposed in grooves 382. Each groove 381 and 382 and each outer insert 391 and 392 has a partial annular shape and extends partly along the outer surface 18, over an angle of 90 degrees around axis Y1. The four inserts 391 and 392 are regularly distributed around axis Y1. As shown in particular on FIGS. 14 and 15, each insert 391 and 392 comprises a body 393 and lateral lugs 394. More precisely, each insert 391 and 392 comprises six lugs 394, with three lugs extending on either upper and lower side of body 393. When tappet 10 is overmolded onto the outer inserts 391 and 392, the lugs 394 are catched in tappet 10, thus strengthening the bond between tappet 10 and inserts 391 and 392.

Other non-shown embodiments can be implemented without leaving the scope of the invention. For example, tappet 10, roller element 40 and/or insert 60 may have different configurations, by example depending on the intended application of system 1.

According to a non-shown embodiment, system 1 may constitute a rocker arm, wherein the support element 10 is not a tappet and wherein the roller element 40 is secured to an arm and a tappet, for example acting on a valve stem.

According to another non-shown embodiment, the two pairs rims 22 and 23 extend from portion 12 in a bifurcated manner, on both side of axis Y1. Pair of rims 22 is projected substantially in a first plane parallel to axis Y1, while pair of rims 23 is projected substantially in a second plane parallel to axis Y1. The pairs of rims 22 and 23 are adapted to receive pin 30 clipped into them.

According to another non-shown embodiment, tabs 26 and 27 may be devoid of stubs 28 and 29. Axial retention of pin 30 is ensured by tabs 26 and 27, while radial retention of pin 30 is ensured by sections 24, 25, 66 and 67.

According to another non-shown embodiment, system 1 comprises no rolling bearing 50, while pin 30 and roller 40 form together a plain bearing. Indeed, in heavy duty applications such as in diesel truck engines, there is a lack of space and/or excessive loads involved for the implementation of the rolling bearing 50, thus justifying the use of a plain bearing.

According to another non-shown embodiment, the pairs of rims 22 and 23 and/or the tabs 26 and 27 are integrally formed with the insert 60 positioned inside the support element 10.

According to another non-shown embodiment, insert 60 is machined then positioned inside tappet 10.

According to another non-shown embodiment, number, shape and/or position of device(s) 70 may vary without leaving the scope of the invention. By example, system 1 may comprise at least two antirotation devices 70 formed on body 11, aligned along direction D1 parallel to axis Y1 or diametrically opposed on either sides of body 11 relative to axis Y1. According to another example, an antirotation device 70 is formed on the outer insert 92. According to another example, insert 60 extends outside cavity 19 and is provided with at least one antirotation device.

Whatever the embodiment, system 1 comprises at least one outer insert 91-392 positioned at the outer surface 18 of the support element 10, preferably at least two outer inserts 91-392. Number, shape and/or position of grooves 81-382 and inserts 91-392 may vary without leaving the scope of the invention. Positioning of the insert(s) 91-392 corresponds to the areas of the tappet 10 where the friction between surface 18 and its non-represented housing is the highest.

In addition, technical features of the different embodiments can be, in whole or part, combined with each other. Thus, the mechanical system 1 and its manufacturing method can be adapted to the specific requirements of the application.

The invention claimed is:

1. A mechanical system, comprising:
   a support element made of a first material and having an outer surface adapted to slide in a housing receiving the mechanical system,
   a pin extending along a first axis and comprising two opposite ends, each adapted to be fitted in the support element for radial and/or axial retention of the pin relative to the first axis, and
   a roller element movable in rotation relative to the pin around the first axis,
   wherein the mechanical system comprises at least one outer insert having at least a partially annular shape and positioned at the outer surface of the support element such that the at least one outer insert is configured to contact the housing, the outer insert being spaced from and not contacting the pin, wherein the at least one outer insert is formed of a second material having a hardness greater than that of the first material, the second material being a steel, the at least one outer insert having a constant outer diameter.

2. The mechanical system according to claim 1, wherein the support element is overmolded onto the at least one outer insert.

3. The mechanical system according to claim 1, wherein the at least one outer insert is snapped in a groove formed in the support element.

4. The mechanical system according to claim 1, wherein the support element is made of a synthetic material.

5. The mechanical system according to claim 1, wherein the support element is made of one of polyamide or polyether-ether-ketone.

6. The mechanical system according to claim 1, comprising at least two outer inserts positioned at the outer surface of the support element.

7. The mechanical system according to claim 1, comprising at least two outer inserts positioned at the outer surface of the support element, distributed at least one of along and around a second axis, wherein the second axis is perpendicular to the first axis and on which the outer surface is centered.

8. The mechanical system according to claim 1, wherein each outer insert is closer to an aperture of the support element opposite the pin than to the pin.

9. The mechanical system according to claim 1, wherein the at least one outer insert has a closed annular shape extending along the outer surface.

10. The mechanical system according to claim 1, wherein the at least one outer insert has a partial annular shape and extends partly along the outer surface, between an angle of 90 and 180 degrees around a second axis perpendicular to the first axis and on which the outer surface is centered.

11. The mechanical system according to claim 1, the at least one outer insert further comprising end lugs.

12. The mechanical system according to claim 1, the at least one outer insert further comprising end lugs, wherein the end lugs are employed for clipping the at least one outer insert onto the support element.

13. The mechanical system according to claim 1, the at least one outer insert further comprising lateral lugs, wherein the lateral lugs are used for strengthening the bond between the at least one outer insert and the support element by overmolding.

14. The mechanical system according to claim 1, further comprising at least one antirotation device integrally formed with at least one of:
   the support element,
   the at least one outer insert, and
   a support insert fixed to the support element.

15. The mechanical system according to claim 1, wherein the mechanical system constitutes a cam follower,
   wherein the support element is a tappet movable along a translation axis perpendicular to the first axis, and
   wherein the roller element is adapted to roll on an outer surface of a cam.

16. The mechanical system according to claim 1, wherein the support element comprises a lower cylindrical portion and an upper cylindrical portion, wherein the upper cylindrical portion further comprises opposing first and second partial bores therein, a first tab extending from the first partial bore in a direction away from the lower cylindrical portion, a second tab extending from the second partial bore in a direction away from the lower cylindrical portion, each of the first and second tabs comprising a stub that extends outward therefrom along the first axis, the first and second tabs not having any through-holes therein,
   the two opposite ends of the pin each comprising a recess therein that are each configured to receive one of the stubs such that the first and second tabs are configured to retain the pin in the axial direction and the stubs are configured to assist in the retention of the pin in the radial direction relative to the first axis.

17. An injection pump for a motor vehicle comprising:
   a mechanical system including:
      a support element made of a first material and having an outer surface adapted to slide in a housing receiving the mechanical system,
      a pin extending along a first axis and comprising two opposite ends, each adapted to be fitted in the support element for radial and/or axial retention of the pin relative to the first axis, and a roller element movable in rotation relative to the pin around the first axis, wherein the mechanical system comprises at least one outer insert having at least a partially annular shape and positioned at the outer surface of the support element such that the at least one outer insert is configured to contact the housing, the outer insert being spaced from and not contacting the pin, wherein the at least one outer insert is formed of a second material having a hardness greater than that of the first material, the second material being a steel, the at least one outer insert having a constant outer diameter, wherein the mechanical system is a subassembly integrated into the injection pump.

18. A valve actuator for a motor vehicle comprising:

a mechanical system including:

a support element made of a first material and having an outer surface adapted to slide in a housing receiving the mechanical system, a pin extending along a first axis and comprising two opposite ends, each adapted to be fitted in the support element for radial and/or axial retention of the pin relative to the first axis, and a roller element movable in rotation relative to the pin around the first axis, wherein the mechanical system comprises at least one outer insert having at least a partially annular shape and positioned at the outer surface of the support element such that the at least one outer insert is configured to contact the housing, the outer insert being spaced from and not contacting the pin, wherein the at least one outer insert is formed of a second material having a hardness greater than that of the first material, the second material being a steel, the at least one outer insert having a constant outer diameter, wherein the mechanical system is a subassembly integrated into the valve actuator.

19. A method for manufacturing a mechanical system comprising steps of:

obtaining components of the mechanical system, the components including:

a support element made of a first material and having an outer surface adapted to slide in a housing receiving the mechanical system, a pin extending along a first axis and comprising two opposite ends, each adapted to be fitted in the support element for at least one of radial retention and axial retention of the pin relative to the first axis, and a roller element, wherein the mechanical system comprises at least one outer insert having at least a partially annular shape and positioned at the outer surface of the support element such that the at least one outer insert is configured to contact the housing, the outer insert being spaced from and not contacting the pin, wherein the at least one outer insert is formed of a second material having a hardness greater than that of the first material, the second material being a steel, the at least one outer insert having a constant outer diameter;

assembling the roller element to be movable in rotation relative to the pin around the first axis, and assembling the support element onto the at least one outer insert by one of:

overmolding the support element onto the at least one outer insert or snapping the at least one outer insert in a groove formed in the support element.

* * * * *